Patented Jan. 9, 1934

1,942,874

UNITED STATES PATENT OFFICE 1,942,874

MOLDED ARTICLE

Clarence A. Nash, North Caldwell, N. J., assignor to Bakelite Corporation, New York, N. Y., a corporation of Delaware No Drawing. Application March 18, 1931, Serial No. 523,645, and in Canada December 2, 1929

7 Claims. (Cl. 106—22)

This invention relates to molded water meter discs, valves and similar articles, and particularly molded articles of this nature subject to contact with hot fluids and where high temperatures or abrasion are apt to occur.

For molded articles of this nature subject to water at various temperatures it is requisite that a composition be used which has a sufficiently low coefficient of expansion so that its dimensions do not vary beyond the limits fixed by operating conditions. Furthermore the composition when molded must possess strength and toughness to withstand normal stresses and blows.

Compositions which I have discovered yield articles possessing these characteristics and are suitable for the molding of water meter discs and the like are those that include as a binder a phenolic resinoid (i. e. a heat-hardenable reaction product of a phenol and a methylene-containing agent) and as a filler about 5 per cent or more (based on the total weight of solids) of finely divided mica. These compositions when properly proportioned are further characterized by a freedom from sticking to the mold and other desirable properties as will be apparent from the description which follows.

Molding compositions conforming to this invention can be obtained, for example, by charging a kneading or mixing machine with the mica or mica-containing filler and then pouring thereon a varnish consisting of about 50 per cent of a phenolic resinoid in a potentially reactive or heat-hardenable condition and about 50 per cent of ethyl alcohol or other known volatile solvent. The mixture is agitated until it presents a homogeneous appearance, and is then placed in pans so that the solvent can be driven off. After drying, preferably under a vacuum at low temperatures, the mixture can be treated in a ball mill to break up any lumps that may have formed, and it is then ready for molding.

The mica when used as a filler in accordance with this invention is in a condition of fine subdivision, for example about 60 mesh and preferably 80 mesh or smaller. In this state of subdivision it is found practical to mold compositions containing mica without experiencing the objectionable sticking to the molds that is likely to occur with mica in the larger flake form.

Other fillers, such as granular material, wood flour, cotton flock, etc. and more particularly long fiber asbestos can be incorporated with the mica before the addition of the varnish. The inclusion of finely divided mica in fillers of this kind has the unexpected result of increasing the flow of the composition during a molding operation even though present in small quantities; for example, a mixture of 37% binder, 58% wood flour and 5% finely divided mica has a better flow in the mold than a mixture of 42% binder and 58% wood flour. It is therefore possible with mica present to have a smaller binder content in the composition and still retain the property of flow so that a mold fills properly. As the binder is by far the most costly ingredient of the composition, this characteristic has practical value. Furthermore the inclusion of mica tends to shorten the time required for the molding operation since it has a better heat conductivity than wood flour.

The resinoid can be incorporated with the filler in other ways than by its addition in the form of a varnish, as by ball-milling the mica filler and the resinoid in a powered form and then rolling the mixture between hot rolls in the usual way. For a satisfactory molding composition that contains mica principally as a filler I have found that 40 per cent is about the upper limit of the amount of resinoid that can be included and 30 per cent is about the lower limit; about 35 per cent is found to be about the most desirable resinoid content.

For the molding of meter discs it is preferable to include long fiber asbestos to impart strength. From 5 to 15 per cent and preferably about 10 per cent of asbestos (based on the total weight of solids) is sufficient for this purpose. Larger amounts have a tendency to affect the surface appearance.

The molding of the discs follows the usual molding practice. A mold is charged with the composition and then submitted to heat and pressure, as for instance a temperature of about 175° C. in the platens of the press and a pressure of about 2000 pounds per square inch.

Articles made from the compositions herein described absorb practically no water, swell but little when exposed to alternate applications of hot and cold water, and have good mechanical strength. In actual practice water meter discs so made have been eminently satisfactory and have proven themselves superior in operation and durability to discs of other molding compositions. In use these discs acquire a very high gloss due to the action of the water and thus showing freedom from surface disintegration.

This is a continuation in part of my application Ser. No. 333,248, filed January 17, 1929.

I claim:

1. Fluid meter part molded from a composition comprising a phenolic resinoid and a filler of finely divided mica and asbestos fiber, said part having a low volume change in the presence of the fluid and under changes of temperature.

2. Fluid meter part molded from a composition comprising approximately about 35 per cent of a phenolic resinoid, about 55 per cent of finely divided mica and about 10 per cent of asbestos fiber resistant to deformation by hot and cold fluids.

3. Water meter disc molded from a composition comprising a reactive phenolic resinoid and a filler including mica subdivided to a fineness of 80 mesh or smaller, said resinoid comprising about 35% of the composition.

4. An article molded from a composition comprising a reactive phenolic resinoid and a filler including finely divided mica, said resinoid comprising not more than 40% of the composition, said article having a low coefficient of expansion in the presence of water and under changes in temperature.

5. A hardenable moldable composition including less than 40 per cent of a reactive phenolic resinoid as a binder and more than 60 per cent of a filler containing approximately 5 per cent or more of finely divided mica and having a low volume change in the presence of hot and cold water.

6. A hardenable moldable composition comprising a reactive phenolic resinoid binder and a filler including finely divided mica, said resinoid comprising not more than 40% of the composition, said hardened composition having a low temperature coefficient of expansion in the presence of fluids absorbed by the composition.

7. Fluid meter part characterized by a low coefficient of expansion in the presence of fluid comprising less than 40 per cent of a hardened phenolic resinoid as a binder and more than 60 per cent of a filler containing approximately 5 per cent or more of finely divided mica.

CLARENCE A. NASH.